Patented June 11, 1929.

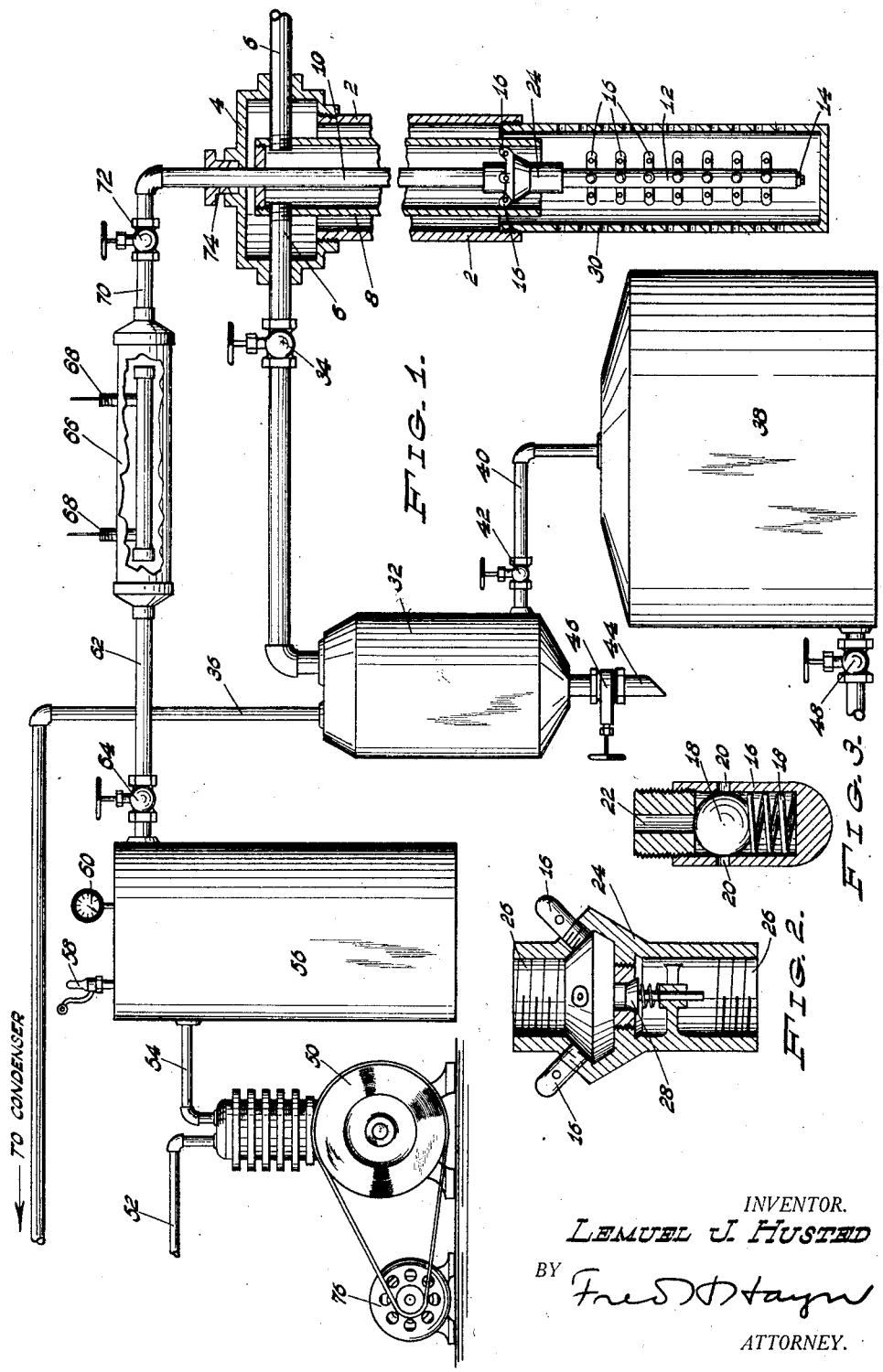

1,716,854

UNITED STATES PATENT OFFICE.

LEMUEL J. HUSTED, OF LOS ANGELES, CALIFORNIA, ASSIGNOR TO OIL WELL REJUVENATING CORPORATION, A CORPORATION OF NEVADA.

APPARATUS FOR HEATING VAPORS BETWEEN COMPRESSORS AND WELLS.

Application filed September 13, 1926. Serial No. 134,982.

My invention relates to a novel form of apparatus for increasing production in the oil wells already positioned in the oil fields, to prolong the life of oil wells and oil fields, to remove waxy or asphaltic obstructions from the oil well and oil sands, to produce viscosity, capillarity, adhesion and frictional resistance, to rejuvenate old oil wells and oil fields and to recover a greater amount of oil from the oil sands.

That much of the oil in a field is never recovered is well known, but how large a proportion is left underground and the possibility of increasing the recovery can not fully be realized until one clearly understands that the exhaustion of an oil well is due more to the exhaustion of the natural gas, which is the principal agent in driving the oil into the well, than to the exhaustion of the oil itself. Authorities claim that the most feasible methods for recovering more oil from the formations is by supplying and applying an external force which would be equally as powerful an expelling agent as were the natural forces.

There are three separate methods for which claims are made whereby such oil might be recovered viz:—

1. The flooding of the oil stratas by water,
2. By a solvent,
3. By heat.

The flooding of oil stratas by water is looked upon with much disfavor as water being an enemy of oil forced into an oil strata forever ruins the strata as a source of supply for petroleum.

Many different kinds and characters of solvents and chemical solutions and heating devices have been and are being tried in various fields; none, however, have proven successful.

The recovery of oil may be divided into two stages viz:—

1. The expulsion of the oil by the natural forces.
2. The use of external forces after the natural forces have become exhausted.

Natural forces are called gases; gases are known as dry or wet.

The physical principles by which gases move the oil are viz:—

1. By direct pressure,
2. Going into solution in the oil under pressure or associating with it,
3. By the carrying or absorption of the vapors of the oil.

There comes a time in the life of a well when practically all the force of the gases has been exhausted and gravitation is the principal remaining force since viscosity, capillarity, adhesion and frictional resistance oppose and retard the flow of the oil and its movement through the sand. And where the dip of the oil sands is low and irregular, and the interspaces of the sands are filled with silty and waxy materials gravity fails to be a reliable energy.

There are so many different kinds and characters of devices now in use that to enumerate them would be impossible. Suffice to say that they are all good in extracting the oil from the well when production comes into the hole, but none, however, supplies sufficient energy or replaces the natural forces to the oil and oil sands whereby the oil in saturation in the sands is recovered, or whereby mud bridges, dams, seals or obstructions are removed, or whereby viscosity, capillarity, adhesion and frictional resistance are reduced.

The best known and most extensively used process is the introducing of compressed dry gas or air in oil wells and sands. Compressed gas or air is a good substitute for the exhausted natural forces, but it being at low temperature when introduced into wells or zones its absorption qualities is nil when compared to what they are if heated.

Gas or air follows the line of least resistance and very often when forced into oil stratas follows cracks, crevices, and larger interspaces of the sands and reaches avenues of escape without actually disturbing or accomplishing any results as far as recovery of oil is concerned, but when heated after being compressed and forced into wells or formations it radiates heat, decreasing viscosity, melts waxy and asphaltic obstructions, generates vapors from the oil which creates pressure which agitates the oil causing a movement of the oil, which opens the pores of the sand, thus delivering the oil to the well, and acts as a better expelling force than were the natural forces as when hot it is a better medium for generating and carrying vapors, melting obstructions, reducing viscosity, capillarity, adhesion and frictional resistance, recovery of oil, prolonging the life of the field.

Various methods of increasing production in oil wells have heretofore been proposed, but without any satisfactory results; in such cases cumbersome and expensive apparatuses have been used for this purpose, with disappointing returns for the money expended.

By the use of my invention it is possible to increase the production of existing wells to a marked degree with minimum expense and without extensive alterations of the apparatus already in use.

The use of a compressed gas or oil in treating a well, falls short of the hoped for results, for the compressed gas or oil has heretofore been introduced therein cold. I have found in practice that by heating a vapor, gas or air after it leaves the compressor, when either natural or other gas is used in the compressor, and then introducing the heated compressed vapor, gas or air into the well excellent results are attained. Accordingly, the main object of my invention is to heat vapor, gas or air as it leaves the compressor. This heated vapor, gas or air not only assists in lifting the fluid in the well, but acts as a solvent, vaporizing the lighter hydro-carbons and causing the fluid in the well to run more freely by decreasing its viscosity.

A further object of my invention is to introduce compressed and heated vapor, gas or air within the well, with or without removing the pumping elements therefrom, thus providing for ease and economy in operation, it being within the province of my invention also to blow the well by the pressure of the heated compressed vapor, gas or air when said well has become sanded, bridged or clogged in some manner, a special mechanism being provided for this purpose.

The above objects and advantages, and those hereinafter appearing, I attain from the disclosure in the specification and the drawing forming a part of this application.

Reference is had to the accompanying drawings, in which similar reference characters denote similar parts. In the drawings, Fig. 1 is a more or less diagrammatic, fragmentary, part sectional view of my novel form of apparatus illustrating the manner in which my novel form of process is carried into effect, Fig. 2 is an enlarged cross-sectional view of the pressure and outlet valve assembly which I may use in connection with the tubing of the well, and Fig. 3 is a similar view of one of the outlet valves.

Describing my invention more in detail, the casing 2 of the well is equipped with a casing head 4, which casing head may have associated therewith any preferred number of pipe connections 6 associated with a liner 8 supported in said head in any manner in practice desired, and within the liner 8 is positioned the tubing 10, the lower end of which is preferably equipped with a perforated end portion 12, preferably plugged at its lower end as indicated by the numeral 14, the perforation being equipped with any desired form of outlet valve 16, more particularly shown in Fig. 3, said valve preferably comprising a ball 18 actuated by a spring 18 of any desired resilience, said ball controlling the outlet ports 20 and the inlet port 22. Of course, any other type of valve may be used, and still remain within the province of my invention.

Positioned above the end portion 12 is a pressure valve casing 24, associated with the portion 12 and the tubing 10, in any manner desired, but preferably by means of the screw-threaded connections 26, as more particularly shown in Fig. 2. The casing 24 is preferably of the double conical type, the upper portion of which is also equipped with any desired number of outlet valves 16, similar in construction to those on the perforated end portion 12 of the tubing 10, and positioned in the casing 24 is the pressure valve 28, spring-pressed, and associated as shown.

The form this valve takes in practice, however, is immaterial. The casing 2 is equipped with the usual perforated portion 30, through which the fluid, as well as sand and other obstructions, enter the well, which sand must from time to time be blown from the well.

The fluid lifted, as well as the lighter hydrocarbons and vapors enter the liner 8, and are conducted to any desired point of discharge by the piping 6. As seen in Fig. 1, this piping may lead to the gas trap 32, a valve 34 used for controlling the flow of the fluid to the trap, which trap may be equipped with piping 36 leading to a condenser, said trap being also connected to an oil tank 38 by a pipe connection 40, containing a controlling valve 42, there being also, if desired, a drain pipe 44, for draining off the sand and the like, which pipe may be controlled by a valve 46. The oil tank 38 may be equipped with a valved draw off connection 48.

As shown in Fig. 1, a compressor 50, equipped with a gas inlet 52, into which the natural gas found in the well or other gas is introduced to be compressed, is provided, the compressed gas, if desired, being conducted by the outlet pipe 54 to a compressed gas tank 56, equipped with the usual relief valve 58 and the pressure gauge 60, an outlet pipe 62, provided with a controlling valve 64 leading to a conventional or other form of heater 66, preferably of the electric type and that disclosed in one of my prior applications, the electric lead 68 supplying the electric current therefor. A pipe connection 70, controlled by a suitable valve 72, leading to the tubing 10 of the well, a stuffing box 74 being used to prevent leakage.

It will of course be understood that the structure just described is suggestive merely, and that the compressed and heated vapor, gas or air may be conveyed to the well in other ways, without disturbing the pumping elements thereof.

In operation the vapor, gas or air is compressed in the compressor 50, operated by the electric motor 76, or otherwise and the compressed vapor, gas or air is confined under pressure in the tank 56. Opening the valve 64, the compressed vapor, gas or air passes through the heater 66, where it is heated to the required temperature, any preferred number of such heaters being provided, after which the compressed and heated vapor, gas or air is introduced into the tubing 10, passing out through the outlet valve 16 and out the perforated portion 30 of the casing into the oil bearing stratas or oil sands. This compressed and heated vapor, gas or air vaporizes the lighter hydrocarbons of the oil, decreases its viscosity, thus permitting it to be lifted more easily by the pressure of the compressed vapor, gas or air or by pumping, the compressed and heated vapor, gas or air also acting as a solvent for the oil.

Should any of the compressed and heated vapor, gas or air condense, it will act as a solvent, thinning out the oil and increase the gasolene content of the oil.

The valve controlled portion 12 may also be used to blow the well when it has become sanded, waxed-over, bridged or otherwise obstructed, by permitting the compressed vapors, gas or air to blow said obstructions through the perforations in the end portion 30 of the well casing 2.

While I have thus described my invention with great particularity, it will be obvious that it may be modified throughout a wide range. I accordingly do not propose to be limited to the exact details of construction shown and described, but reserve the right in practice to make any and all modifications thereof that fall within the scope of the appended claims.

I claim as my invention:

1. In a device of the character described, a pipe for conveying into a well a heated fluid under pressure, said pipe closed at its free end and provided with a check valve arranged to be unseated by the fluid pressure and to seat to confine the fluid pressure to the well, supplemental valves on said pipe for relieving the pressure of the pressure fluid and a plurality of valves on said pipe below said check valve acting to admit the pressure fluid into the well and check the flow of liquid into said pipe.

2. In a device of the character described, a pipe for conveying into a well a heated fluid under pressure, said pipe closed at its free end and provided with a plurality of valves arranged circumferentially thereof to admit the pressure fluid to the well and check the inflow of liquid into said pipe, and a check valve on said pipe and above said valves to admit the pressure fluid to the valve portion of the pipe and check the escape of pressure fluid back through said pipe.

3. In a device of the character described, a pipe for conveying a heated fluid under pressure to a well, a plurality of circumferentially arranged superposed valves on said pipe to admit the pressure fluid to the well and check the inflow of liquid to said pipe, a check valve in said pipe above said valves to admit the pressure fluid to the valved-portion of said pipe and check the back flow thereinto, and pressure fluid relief valves on said pipe.

4. In a device of the character described, a pipe for conveying a heated fluid under pressure to a well, a valve chamber at one end connected to the end of said pipe, a check valve in said chamber to admit the pressure fluid therethrough and check the back flow thereof, a pipe connected to the other end of said valve chamber and arranged to extend into the oil bearing strata, and a plurality of superposed valves on said last named pipe to admit the pressure fluid therethrough and check the passage of fluid into said pipe.

5. A combined well blower and fluid lifting device adapted for special use in connection with a fluid lifting system and adapted to be connected to the tubing of an oil well, said device comprising an elongated member, plugged at one end, a set of outwardly opening valves positioned along the longitudinal length of said member, a valved top portion detachably associated with said member, and a pressure valve in said top portion whereby heated fluid may be introduced in said top portion and discharged therefrom, or admitted to said member and discharged therefrom for the purpose set forth.

In testimony whereof I have signed my name to this specification.

LEMUEL J. HUSTED.